US009594826B2

(12) United States Patent
Jing et al.

(10) Patent No.: US 9,594,826 B2
(45) Date of Patent: *Mar. 14, 2017

(54) CO-SELECTED IMAGE CLASSIFICATION

(71) Applicant: Google Inc., Mountain View, CA (US)

(72) Inventors: Yushi Jing, San Francisco, CA (US);
Boon-Lock Yeo, Los Altos, CA (US);
Yong Zhang, Shanghai (CN); Guang Hua Li, Shanghai (CN); Gangjiang Li, Shanghai (CN); Hui Li, Shanghai (CN)

(73) Assignee: Google Inc., Mountain View, CA (US)

(*) Notice: Subject to any disclaimer, the term of this patent is extended or adjusted under 35 U.S.C. 154(b) by 288 days.

This patent is subject to a terminal disclaimer.

(21) Appl. No.: 14/319,888

(22) Filed: Jun. 30, 2014

(65) Prior Publication Data

US 2015/0012547 A1 Jan. 8, 2015

Related U.S. Application Data

(63) Continuation of application No. 13/375,565, filed as application No. PCT/CN2009/000618 on Jun. 3, 2009, now Pat. No. 8,856,124.

(51) Int. Cl.
*G06F 17/30* (2006.01)
*G06K 9/62* (2006.01)

(52) U.S. Cl.
CPC ...... *G06F 17/30616* (2013.01); *G06F 17/301* (2013.01); *G06F 17/30265* (2013.01); *G06F 17/30864* (2013.01); *G06K 9/6254* (2013.01)

(58) Field of Classification Search
USPC ........ 707/749, 737, 769, 727, 728; 382/203, 382/224, 190, 155, 305
See application file for complete search history.

(56) References Cited

U.S. PATENT DOCUMENTS 6,037,939 A * 3/2000 Kashiwagi ............. G06F 3/038
715/767
6,408,301 B1 * 6/2002 Patton ............... G06F 17/30265
707/741
(Continued)

FOREIGN PATENT DOCUMENTS

CN 101010698 A 8/2007
CN 101278286 A 10/2008
(Continued)

OTHER PUBLICATIONS

Notification of Transmittal of the International Search Report and the Written Opinion of the International Searching Authority, or the Declaration; World Intellectual Property Organization (WIPO) (International Bureau of), Examiner, Publication Issued, Mar. 11, 2010; PCT/CN2009/000618, 11 pages.
(Continued)

*Primary Examiner* — Mariela Reyes
*Assistant Examiner* — Thong Vu
(74) *Attorney, Agent, or Firm* — Fish & Richardson P.C.

(57) ABSTRACT

Co-selected images are labeled based on a topic score that is a measure of relevance of the co-selected image to a first topic to which a reference image belongs. The first topic to which the reference image belongs is identified based on a reference label associated with the reference image. The co-selected images are images that are selected for presentation subsequent to selection of the reference image during a user session. The co-selected images are identified based on selection data for user sessions in which the reference image was selected for presentation. The topic score is generated based on a frequency of selection of the co-selected image. Image search results for a second topic can be filtered to remove images that are labeled as belonging to the first topic or the image search results can be reordered to (Continued)

adjust the presentation positions at which images are referenced based on the topic to which the images belong.

20 Claims, 8 Drawing Sheets

(56) References Cited

U.S. PATENT DOCUMENTS

| | | | | |
|---|---|---|---|---|
| 6,556,724 | B1* | 4/2003 | Chang | G06F 3/1454 345/1.2 |
| 7,979,358 | B1* | 7/2011 | Clem | G06Q 10/08 705/300 |
| 8,224,089 | B2* | 7/2012 | Nielsen | G06K 9/342 382/173 |
| 8,489,627 | B1* | 7/2013 | Brandt | G06F 17/30277 707/765 |
| 2001/0042087 | A1 | 11/2001 | Kephart | |
| 2003/0195883 | A1* | 10/2003 | Mojsilovic | G06F 17/30256 |
| 2003/0228042 | A1* | 12/2003 | Sinha | G06T 7/0012 382/131 |
| 2004/0001631 | A1* | 1/2004 | Camara | G06F 17/30265 382/224 |
| 2004/0120582 | A1 | 6/2004 | Sarkar | |
| 2005/0053267 | A1* | 3/2005 | Mostafavi | G06T 7/206 382/128 |
| 2005/0147302 | A1* | 7/2005 | Leung | G06K 9/4685 382/190 |
| 2006/0253491 | A1* | 11/2006 | Gokturk | G06F 17/30256 |
| 2006/0274062 | A1 | 12/2006 | Zhang | |
| 2007/0198534 | A1* | 8/2007 | Hon | G06F 17/30058 |
| 2007/0297657 | A1* | 12/2007 | Mattes | G06T 7/0081 382/128 |
| 2008/0104535 | A1* | 5/2008 | DeLine | G06F 3/0483 715/785 |
| 2008/0247667 | A1* | 10/2008 | Jin | G06T 3/4038 382/284 |
| 2008/0249967 | A1* | 10/2008 | Flinn | G06N 3/004 706/11 |
| 2009/0006357 | A1 | 1/2009 | Popescul | |
| 2009/0129667 | A1* | 5/2009 | Ho | G06T 7/0065 382/154 |
| 2009/0185723 | A1* | 7/2009 | Kurtz | G06K 9/00288 382/118 |
| 2009/0214098 | A1* | 8/2009 | Hornegger | A61B 6/032 382/131 |
| 2009/0254539 | A1 | 10/2009 | Wen | |
| 2010/0046842 | A1* | 2/2010 | Conwell | G06F 17/30265 382/218 |
| 2012/0155778 | A1* | 6/2012 | Buchmueller | G06F 17/30277 382/209 |
| 2014/0040262 | A1* | 2/2014 | Winter | G06F 17/30778 707/737 |
| 2015/0120680 | A1* | 4/2015 | Alonso | G06F 17/30719 707/692 |

FOREIGN PATENT DOCUMENTS

| | | |
|---|---|---|
| CN | 101295305 A | 10/2008 |
| JP | 2002288189 A | 10/2002 |
| JP | 2005100160 A | 4/2005 |
| JP | 2006004157 A5 | 3/2007 |
| JP | 2006115045 A1 | 12/2008 |
| WO | 20060119482 | 11/2006 |
| WO | WO2007100848 A3 | 10/2007 |

OTHER PUBLICATIONS

The Anatomy of a Large-Scale Hypertextual; Brin et al; Computer Networks; http://infolab.stanford.edu/~backrub/google.html; Sep. 12, 2012; 1998; 16 pages.

Inferring Web communities from link topology.; Gibson et al; Proc. 9th ACM Conference on Hypertext and Hypermedia; http://www.cs.cornell.edu/home/kleinber/ht98-comm.pdf; Sep. 12, 2012; 1998; 10 pages.

Topic-Sensitive PageRank: A Context-Sensitive Ranking Algorithm for Web Search; Haveliwala, T.H.; IEEE Transactions on Knowledge and Data Engineering; http://ilpubs.stanford.edu:8090/750/2003-29.pdf; Sep. 12, 2012; 2003; 22 pages.

VisualRank, apply PageRank to Google Image Search.; Jing, Baluja; IEEE Transactions on Pattern Recognition and Machine Intelligence (TPAMI; http://vc.cs.nthu.edu.tw/home/paper/codfiles/chyu/200906300556/VisualRank%20Applying%20PageRank%20to%20Large-Scale%20Image%20Search.pdf; Sep. 12, 2012; 2008; 14 pages.

Partially Labelled classification with Markov random walks; Szummer et al; NIPS; http://people.ee.duke.edu/~Icarin/SzummerJaakkola.pdf,; Sep. 12, 2012; 2001; 8 pages.

Notice of Reasons for Rejection for JP 2012-513434 dated Jul. 7, 2013, 3 pages.

Notification of the First Office Action for CN 200980160571.9 dated Feb. 18, 2013, 7 pages.

Urban et al., "Adaptive image retrieval using a Graph model for semantic feature integration," Proceedings of the ACM International Multimedia Conference and Exhibition—MIR 2006; Oct. 26-27, 2006, ACM, New York, NY, US, Oct. 26, 2006 , 117-126.

Szummer et al., "Behavioral classification on the click graph," Proceeding of the 17th International Conference on World Wide Web , WWW *08, Apr. 21-25, 2008, p. 1241-1242.

Han et al., "A Memory Learning Framework for Effective Image Retrieval," IEEE Transactions on Image Processing,IEEE Service Center, Piscataway, NJ, US, Apr. 1, 2005, 14(4):511-524.

Song et al., "Improving the Image Retrieval Results Via Topic Coverage Graph," Jan. 1, 2006, Advances in Multimedia Information Processing—PCM 2006 Lecture Notes in Computer Science; LNCS, Springer, 193-200.

Extended European Search Report in European Application No. 09845372.3, dated Mar. 27, 2014, 10 pages.

Office Action issued in Australian Application No. 2009347535 on Jun. 19, 2014, 3 pages.

Office Action issued in Canadian Application No. 2,764,243 on Aug. 12, 2015, 3 pages.

* cited by examiner

600 ↴

| Node ID | Topic Score |
|---|---|
| Node 702a | 0.00 |
| Node 702b | 1.00 |
| Node 702c | 0.5 |
| Node 702d | 0.5 |
| Node 702e | 0.5 |

| Co-Selection Matrix | Node 702a | Node 702b | Node 702c | Node 702d | Node 702e |
|---|---|---|---|---|---|
| Node 702a | 1 | 0 | 0.7 | 0.1 | 0.4 |
| Node 702b | 0 | 1 | 0.1 | 0.7 | 0.5 |
| Node 702c | 0.7 | 0.1 | 1 | 0 | 0.4 |
| Node 702d | 0.1 | 0.7 | 0 | 1 | 0.5 |
| Node 702e | 0.4 | 0.5 | 0.4 | 0.5 | 1 |

FIG. 6B

CO-SELECTED IMAGE CLASSIFICATION

BACKGROUND

The present disclosure relates to data processing, and in particular, image classification.

Users can locate images that are available on the Internet by submitting a search query to a search engine. The search query can be a text query that includes words describing image subject matter for which the user is attempting to locate. The search system identifies images that correspond to the subject matter and provides image search results that include references to the identified images. The images can be identified, for example, based on labels that are associated with the images and/or text appearing near the images on the web pages with which the images are presented.

The identified images can be, for example, images that are presented with web pages. Many different categories of webpages can include images that are identified in response to a search query. For example, images are provided with webpages such as weblogs ("blogs"), social networking pages and newsgroups that can be published by many different individuals. Within a single domain (e.g., www.example.com) there can be thousands of webpages, many of which have different individual authors.

Due to the large number of different authors creating webpages located in the same domain, it can be difficult to classify images provided through the domain as belonging to a common topic. For example, within a single blog domain, users may publish blogs directed to topics ranging from sports, to politics, to parenting advice, or even explicit (e.g., pornographic) topics. Thus, if each image available through a common domain is classified as belonging to a common topic, the images may not be accurately classified.

Labels associated with the image and/or text appearing near the image can inaccurately describe the subject matter of the image or be ambiguous among different topics. For example, an image of Babe Ruth appearing in a blog may be associated with the text "The Babe." While this text is relevant to the image, it is possible that the image could be of Babe Ruth, an actor playing Babe Ruth, a pig featured in a move titled "Babe," or even explicit images.

Providing images that are less relevant to the topic of a user query can reduce the quality of image search results. This is particularly true when images including explicit content (e.g., pornography) are referenced in search results responsive to a query that is not directed to the explicit content. For example, search results responsive to a search query for "Babe Movie" including an explicit image can substantially reduce the quality of the search results for a user that is searching for images of Babe Ruth.

The quality of image search results can be enhanced when images are accurately classified, such that images that are not relevant to the user query can be filtered or otherwise suppressed.

SUMMARY

An image classification system analyzes image selection data to classify and label images based on a topic to which a previously selected image belongs. These labels can then be used to filter image search results to remove references to images that are more relevant to a topic other than the topic to which a search query is directed. Additionally, the labels can be used to filter all images that are directed to a topic (e.g., explicit content), unless a user opts to have references to these images presented. The labels can also be used to adjust the presentation position at which images are referenced in image search results based on topics to which the images belong.

In general, one aspect of the subject matter described in this specification can be implemented in methods that include the actions obtaining a reference label for a reference image, the reference label being a label that specifies a first topic to which the reference image belongs; identifying, in a data processing system, user sessions during which the reference image was selected for presentation, each user session being a period for which selections of images are associated into a session set; identifying, in the data processing system, co-selected images for the reference image that were selected for presentation during the user sessions, a co-selected image being an image that is selected subsequent to selection of the reference image; for each co-selected image, generating, in the data processing system, a topic score based on a frequency of selection of the co-selected image for the reference image, the topic score representing a measure of relevance of the co-selected image to the first topic; and labeling co-selected images having topic scores that satisfy a threshold topic score as belonging to the first topic. This and other embodiments of this aspect include corresponding systems, apparatus, and computer program products.

These and other embodiments can optionally include one or more of the following features. The methods can further include the actions identifying, for a user session, a first time of selection for the reference image; identifying subsequent times of selection for co-selected images selected during the user session; and identifying, as co-selected images, only images having subsequent times of selection that are within a threshold time period relative to the first time of selection, wherein the user session has a session time period and the threshold time period is less than the session time period.

The topic score can be generated by obtaining initial topic scores for the co-selected images, each initial topic score being an initial relevance measure of the image to the first topic; obtaining co-selection data for the co-selected images, the co-selection data specifying selections of the co-selected images relative to selections of the reference image or other co-selected images; computing an updated topic score for the co-selected images based on a function of the initial topic scores and the co-selection data; determining whether a stop condition has occurred; when the stop condition has not occurred, computing additional updated topic scores based on the co-selection data and previously computed updated topic scores; when the stop condition has occurred, classifying the co-selected images based on the updated topic scores; and wherein the labeling is based on the updated topic scores.

Particular embodiments of the invention can be implemented to realize one or more of the following advantages. Topics to which unclassified images belong can be identified as belonging to reference topics based on co-selection data relative to a reference image for the reference topic. Images that are identified as belonging to a reference topic can be filtered from image search results. Images belonging to a reference topic can be selected for presentation at higher or, lower presentation positions in image search results relative to images that are not identified as belonging to the reference topic. Images can be labeled with a label corresponding to a reference topic based on co-selection data relative to a reference image for the reference topic. An image can be identified and labeled as a pornographic image based on subsequent selection of the images following selection of an image that has a high likelihood of being pornographic. Each image in a corpus of images can be categorized based on its selection relative to selections of reference images for reference topics.

The details of one or more embodiments of the invention are set forth in the accompanying drawings and the description below. Other features, aspects, and advantages of the invention will become apparent from the description, the drawings, and the claims.

BRIEF DESCRIPTION OF THE DRAWINGS

FIG. 6A is an example table in which the topic scores for a set of images can be stored and tracked.

FIG. 6B is an example table in which co-selection data defining a co-selection matrix can be stored.

Like reference numbers and designations in the various drawings indicate like elements.

DETAILED DESCRIPTION

An image classification system analyzes image selection data to classify and label images based on a topic to which a previously selected image belongs. These labels can then be used to filter image search results to remove references to images that are more relevant to a topic other than the topic to which a search query is directed. Additionally, the labels can be used to filter all images that are directed to a topic (e.g., explicit content), unless a user opts to have references to these images presented.

An online environment in which search services are provided is described below. An image classification system that labels images based on selection data is described with reference to this online environment as a subsystem of a search system. However, the image classification subsystem can be implemented independent of the image search system.

Figure 1:
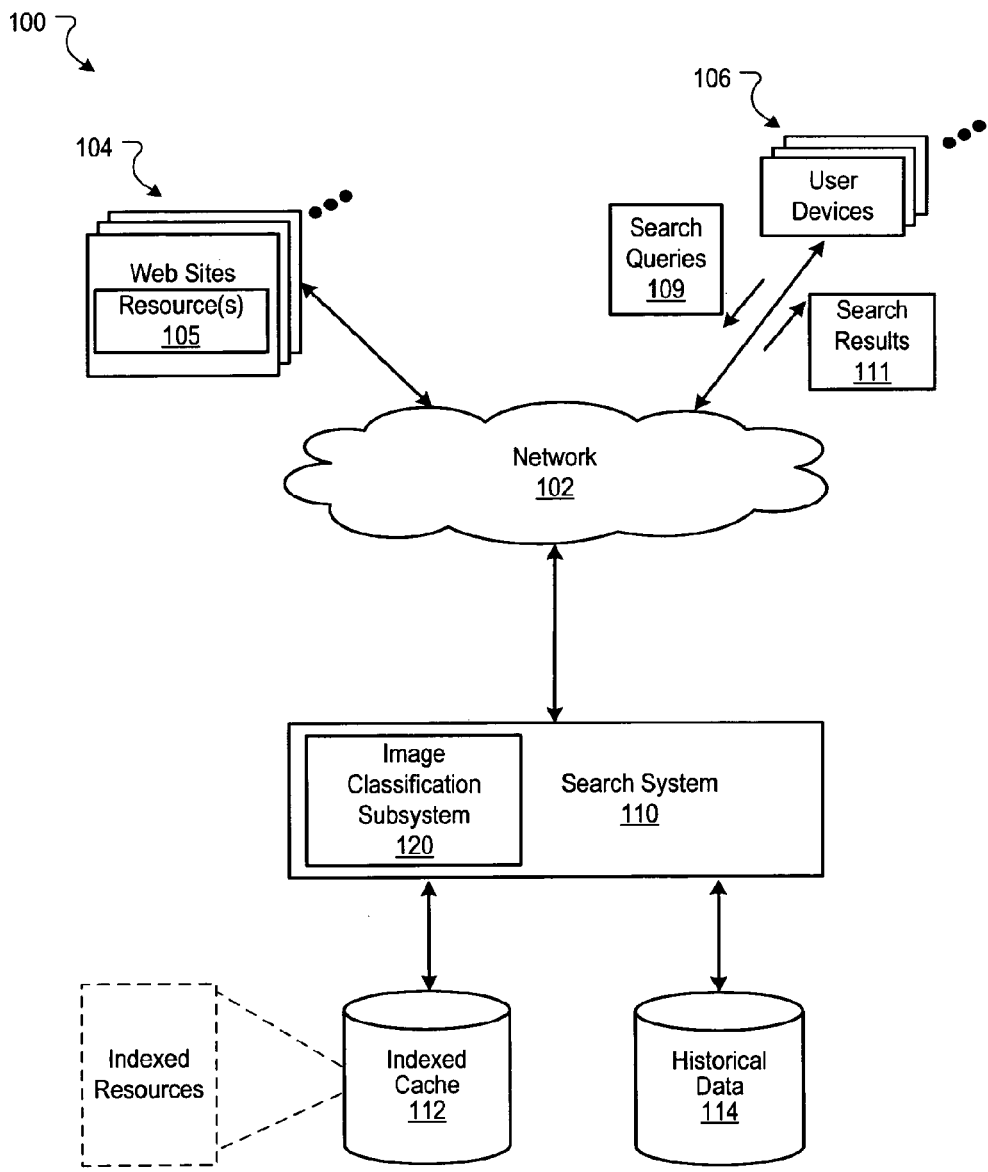
FIG. 1 is a block diagram of an example environment in which a search system provides search services.

FIG. 1 is a block diagram of an example environment 100 in which a search system 110 provides search services. The example environment 100 includes a network such as a local area network (LAN), wide area network (WAN), the Internet, or a combination thereof, connects web sites 104, user devices 106, and the search system 110. The online environment 100 may include many thousands of web sites 104 and user devices 106.

A web site 104 is one or more resources associated with a domain name and hosted by one or more servers. An example web site is a collection of web pages formatted in hypertext markup language (HTML) that can contain text, images, multimedia content, and programming elements, e.g., scripts. Each web site 104 is maintained by a publisher, e.g., an entity that manages and/or owns the web site.

A resource is any data that can be provided by the web site 104 over the network 102 and that is associated with a resource address. Resources include HTML pages, word processing documents, and portable document format (PDF) documents, images, video, and feed sources, to name just a few. The resources can include content, e.g., words, phrases, images and sounds and may include embedded information (such as meta information and hyperlinks) and/or embedded instructions (such as JavaScript scripts).

Each resource has an addressable storage location that can be uniquely identified. The addressable location is addressed by a resource locator, such as a universal resource locator (URL).

A user device 106 is an electronic device that is under control of a user and is capable of requesting and receiving resources over the network 102. Example user devices 106 include personal computers, mobile communication devices, and other devices that can send and receive data over the network 102. A user device 106 typically includes a user application, such as a web browser, to facilitate the sending and receiving of data over the network 102.

To facilitate searching of these resources, the search system 110 identifies the resources by crawling and indexing the resources provided by the publishers on the web pages 104. Data about the resources can be indexed based on the resource to which the data corresponds. The indexed and, optionally, cached copies of the resources are stored in an indexed cache 112.

The user devices 106 submit search queries 109 to the search system 110. In response, the search system 110 accesses the indexed cache 112 to identify resources that are relevant to the search query 109. The search system 110 identifies the resources in the form of search results 111 and returns the search results 111 to the user devices 106 in search results pages. A search result 111 is data generated by the search system 110 that identifies a resource that is responsive to a particular search query, and includes a link to the resource. An example search result 111 can include a web page title, a snippet of text or a portion of an image extracted from the web page, and the URL of the web page.

For a search of textual content, the search results are ranked based on scores related to the resources identified by the search results, such as information retrieval ("IR") scores, and optionally a separate ranking of each resource relative to other resources (a "page rank" score). In some implementations, the IR scores are computed from dot products of feature vectors corresponding to a search query 109 and a resource, and the ranking of the search results is based on relevance scores that are a combination of the IR scores and page quality scores. The search results 111 are ordered according to these relevance scores and provided to the user device according to the order.

For a search directed to images and that uses a text query as input, the search system 110 can combine the relevance score of a resource with a relevance feedback score of an image embedded in the resource. An example relevance feedback score is a score derived from a selection rate of an image when that image is referenced in a search result. These combined scores are then used to present search results directed to the images embedded in the resources.

The user devices 106 receive the search results pages e.g., in the form of one or more web pages, and render the pages for presentation to users. In response to the user selecting a link in a search result at a user device 106, the user device 106 requests the resource identified by the link. The web site 104 hosting the resource receives the request for the resource from the user device 106 and provides the resource to the requesting user device 106.

Search queries 109 submitted during user sessions are stored in a data store such as the historical data store 114. Selection data specifying actions taken in response to search results provided during the user sessions are also stored in a data store such as the historical data store 114. These actions can include whether a search result was selected and/or a "dwell time" associated with the selection (i.e., a time period between the selection and a subsequent selection. The data stored in the historical data store 114 can be used to map search queries 109 submitted during user sessions to resources that were identified in search results 111 and the actions taken by users, e.g., an ordered list of resources that were selected for presentation during the user session.

A user session is a period during which data specifying actions taken with respect to resources are associated with a common session identifier. The period of a user session can be measured by time, a number of actions taken or some other delineation of user actions. For example, a user session can include user actions with respect to resources over a minute, an hour, a day, or any other time period. Similarly, a user session can include a threshold number of user selections of resources.

Each user session can be associated with a unique session identifier. The unique session identifier can be generated, for example, based on one or more of a user device identifier, a time indicator for the user session and other data indicative of the context of the user session (e.g., geographic region from which the user session originates). The user device identifier can be, for example, an anonymized identifier, such as a cookie that has been anonymized (i.e., an anonymized string of text that serves as an identifier for the user session) that is associated with a user device 106 to which the user session corresponds. Thus, actions occurring during a user session can be disassociated from the particular user device 106 from which the action originated.

Actions, such as selections of images, that occur during a particular user session are associated with the same unique session identifier. Additionally, each action occurring during the particular user session can be associated with additional time data indicating a time at which the action occurred. The time can be an absolute time, such as the Greenwich Mean Time at which the action took place, or a time relative to a start of the user session or a time relative to another user action.

User session data specifying the actions that occurred during each user session can be stored in a data store such as the historical data 114. The user session data can be used to identify images that were sequentially selected during a particular user session and identify images that belong to a common topic based on their sequential selection.

The search system 110 includes an image classification subsystem 120. In some implementations, the image classification subsystem 120 includes one or more processors configured to classify an image to a topic based on user session data. The image classification subsystem 120 analyzes the user session data to identify images that were selected subsequent to selection of a reference image. The reference image is an image that is pre-classified with a known topic, e.g., an image having a label that specifies a topic to which the reference image belongs. Images that are selected subsequent to selection of a reference image during a particular user session are referred to as co-selected images for the reference image.

The images selected by a user during a particular user session are generally more likely to belong to the same topic. Therefore, co-selected images for a reference image are more likely to belong to the same topic as the reference image than images that are not co-selected images for the reference image. For example, images that are co-selected images for a pornographic reference image are more likely to be pornographic images than images that are not co-selected images for a pornographic image. Similarly, images that are co-selected for a non-pornographic reference image are more likely to be non-pornographic images. Thus, images that are frequently co-selected images for a reference image or a set of reference images can be classified as belonging to the same topic as the reference image with a high degree of confidence.

In some implementations, the image classification subsystem 120 generates a topic score that represents the likelihood that a co-selected image belongs to the same topic as the reference image. The topic score for a co-selected image can be generated, for example, based on a frequency with which the image is co-selected with the reference image and a proximity of the co-selection (e.g., time or actions between the selections) of the image relative to selection of the reference image. Methods of generating a topic score are described with reference to FIG. 2 and FIGS. 6-7, respectively.

Co-selected images having a threshold topic score are identified as belonging to the same topic as the reference image. The threshold topic score can be specified, for example, as an absolute topic score, or a highest N percentage of topic scores among other thresholds (e.g., images having a highest M topic scores).

The image classification subsystem 120 can label co-selected images that are identified as belonging to the same topic as the reference image with textual data corresponding to the topic. Alternatively, a topic flag represented by a data bit can be set indicating that the co-selected image belongs to the topic can be set and stored at a memory location associated with the co-selected image in the indexed cache 112. In turn, the co-selected image can be identified as a new reference image for the topic such that selection of other images subsequent to selection of the new reference image will be an indication that the other images also belong to the topic. This classification process can propagate through a corpus of images until a threshold number of the images or all of the images have been classified.

In some implementations, image search results 111 responsive to search queries 109 can be filtered or reordered for presentation based on the classification by the image classification system 120. For example, classification data (e.g., labels or topic flags) identifying the images that are identified as pornographic images can be made available to the search system 110. The search system 110 can use the classification data to analyze image search results responsive to a search query 109 to determine whether any of the images that are referenced by the image search results are pornographic images. References to pornographic images can be removed or presented at less prominent positions of the search results to increase the quality of the search results. Such modifications can be subject to user preferences.

Similarly, the image search results that are generated for a search query 109 can exclude or select images to reference in the image search results based on the label. For example, the search system 110 can use label data stored at a memory locations associated with the images in the indexed cache 112 to obtain images that are relevant to the search query 109. Images that are associated with a label that is more relevant to the search query 109 can be identified as more relevant to the search query 109 than images that are associated with images that are less relevant to the search query 109.

For example, if the image classification subsystem 120 labeled an image of Babe Ruth with the textual data "baseball," the image of Babe Ruth would be more relevant to a search query 109 for "baseball" than a search query 109 for "pig movie." Thus, a reference to the image of Babe Ruth could appear higher in image search results for "baseball" and may not appear in image search results for the search query "pig movie."

Figure 2:
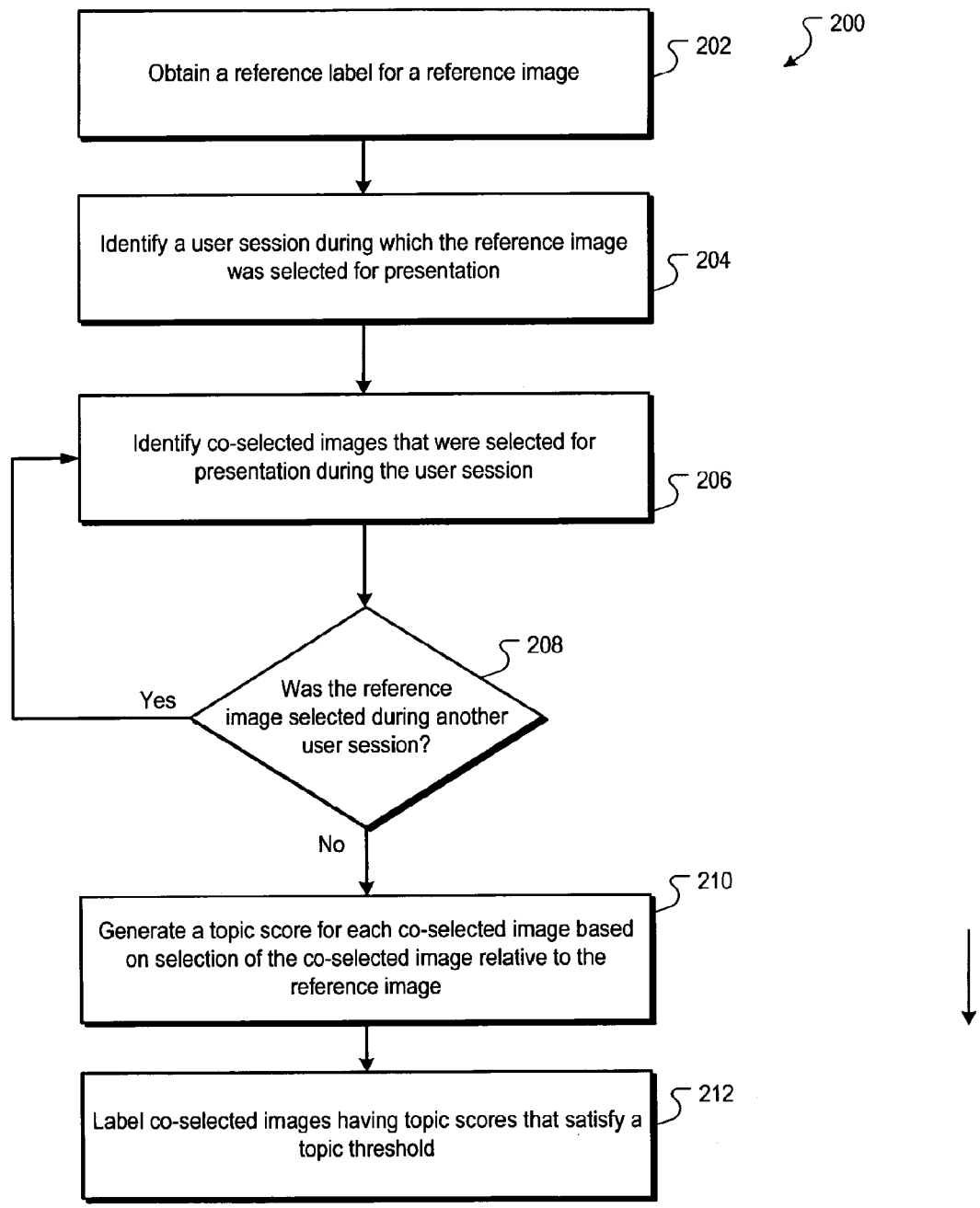
FIG. 2 is a flow chart of an example process for classifying images to a topic.

FIG. 2 is a flow chart of an example process 200 for classifying images to a topic. The process 200 can be implemented, for example, by the image classification subsystem 120 of FIG. 1.

A reference label is obtained for a reference image (202). In some implementations, the reference label is a label that specifies a reference topic to which the reference image belongs. The reference label can be, for example, a textual label or a topic flag that is indicative of the reference topic. For example, a reference label corresponding to the reference topic may be represented by a data bit corresponding to the reference topic being set to a specified binary value. Alternatively, the reference label can be textual data corresponding to the reference label. For example, a pornographic image can be labeled with the text "explicit" or "pornographic."

In some implementations, human evaluators can identify a pornographic image and label the pornographic image with a reference label that identifies the image as a pornographic image. In other implementations, the pornographic image can be identified by a machine and labeled with a reference label accordingly. In turn, the reference label can be verified for accuracy by the evaluators.

Reference labels can be obtained from a data store storing labels corresponding to images, or generated based on data associated with the image. Labels for images can be generated using image processing techniques to determine whether visual characteristics of the image are indicative of a pornographic image and/or textual analysis to determine whether text associated with the image is indicative of a pornographic image.

The reference labels for a reference image can be generated, for example, based on image processing techniques. In some implementations, visual characteristics (i.e., color and/or texture) of an image can be compared to visual characteristics of images that have been previously labeled with the reference label or otherwise identified to belong to the topic represented by the reference label (e.g., identified as a pornographic image). For example, one method of identifying pornographic images is to identify a portion (e.g., number or percentage) of the pixels for the image that are "skin pixels" (i.e., pixels having a color value corresponding to a skin tone). When the portion of pixels exceeds a threshold, the image can be identified as a pornographic image and labeled with a reference label that corresponds to a pornographic topic.

The reference label can also be generated, for example, based on textual data located near the reference image on a web page with which the reference image is presented. For example, text appearing within a threshold number of pixels of the reference image can be analyzed to identify topics that may be relevant to the reference image. The reference label can also be generated based on other text that is associated with the reference image. For example, a reference label can be generated based on text that is included in a file name for the reference image, anchor text of a link to the image, or text that is explicitly associated with the reference image.

Text can be explicitly associated with a reference image by publishers to facilitate identification of the image as relevant to search queries for a particular topic. For example, a publisher can specify the text "baseball" with an image of a baseball player to increase the likelihood that the image is identified in response to a search query including the term "baseball."

In some implementations, a reference label for a reference image is required to have a threshold likelihood of accurately describing the content of the reference image. The accuracy of a label for an image can be determined, for example, based on label feedback. Label feedback is data obtained from users that specifies a reference label for an image or provides a measure of relevance between a label and the reference image.

Label feedback can be received from a user that has been requested to label images or confirm existing labels for images. Alternatively, label feedback can be received from anonymous users that are provided images and requested to select topics to which the images are most relevant and/or least relevant. For example, users can be provided with an image and a list of M topics. The users can select one of the M topics that is most relevant to the image or most accurately describes the content of the image. User selections of topics that are most relevant to the content of the image can be aggregated to determine the topic to which the image belongs. For example, if a threshold percentage of users selected a particular topic as being most relevant to the image, the particular topic can selected as the topic to which the image belongs.

Label feedback can also be analyzed to determine a likelihood that an existing label for the reference image is accurate. The likelihood that the existing label for the image is accurate can be based on a portion of user feedback that identifies the existing label as an accurate label for the image. For example, if a threshold percentage of the user feedback indicates that the existing label is an accurate label for the image, then the existing label can be identified as a reference label for the reference image. In turn, the reference image can be identified as belonging to the topic specified by the reference label.

In some implementations, the portion user feedback identifying the image as belonging to the topic specified by the reference image can be used as a measure of the strength of the reference image to the topic. For example, the likelihood that the label is accurate can be used as a probability that the image is a reference image belonging to the topic specified by the label. The likelihood that the image is a reference image can, in turn, be used as a weight identifying the strength of the image as a reference image for the topic specified by the label. The strength of the image as a reference image can be used when generating topic scores for other images, as discussed below with reference to FIG. 4.

A user session during which the reference image was selected for presentation is identified (204). The user session during which the image was selected for presentation can be identified by identifying unique session identifiers that are associated with selection data for the reference image. For example, selection data stored in the historical data 114 of FIG. 1 can be obtained for the reference image. In turn, unique session identifiers associated with the selection data can be analyzed to identify a user session during which the reference image was selected for presentation. Generation of selection data for a user session is described in more detail with reference to FIG. 3.

Co-selected images for the reference image that were selected for presentation during the user session are identified (206). In some implementations, the co-selected images can be identified based on selection data for images that are associated with the unique session identifier for the user session. For example, selection data in the historical data 114 of FIG. 1 that is associated with the unique session identifier for the reference image can be obtained. The selection data is analyzed to identify images that were co-selected with the reference image. For example, time data included in the selection data for an image can be analyzed to determine whether the image was selected for presentation prior to or subsequent to selection of the reference image. Images that were selected for presentation subsequent to the selection of the reference image are identified as co-selected images.

A determination is made whether the reference image was selected during another user session (208). The determination can be made, for example, by determining whether selection data for the reference image is associated with another unique session identifier. The reference image can be identified as being selected during another user session when selection data for the reference image is associated with another unique session identifier. If the reference image was selected during another user session, co-selected images for the reference image that were selected for presentation during the user session are identified (206).

When the reference image was not selected during another user session or after all additional user sessions have been identified, a topic score is generated for each co-selected image based on the selections of the co-selected images relative to selection of the reference image (210). In some implementations, the topic score is a measure of relevance of the co-selected image to the topic. Each selection of a co-selected image subsequent to selection of the reference image increases the likelihood that the co-selected image is relevant to the reference image, and, therefore belongs to the same topic as the reference image. For example, a co-selected image that is selected more frequently following selection of the reference image than another co-selected image is likely more relevant to the same topic as the reference image than the less frequently selected co-selected image.

The likelihood that a co-selected image is relevant to the reference image can also be based on a dwell time associated with the selections of a co-selected image. For example, a co-selected image having a longer dwell time than another co-selected image is more likely relevant to the same topic as the reference image because the user spent more time viewing the co-selected image with the longer dwell time.

The likelihood that a co-selected image is relevant to the reference image can also be based on a proximity of the selection of the co-selected image to selection of the reference image. The proximity of selection can be measured in units of time, number of user actions, or any other delineation of a user session.

For example, a co-selected image that is the first image selected following selection of the reference image is more likely relevant to the same topic as the reference image than another co-selected image that is the fourth image selected following selection of the reference image. Therefore, the co-selected image selected first following selection of the reference image is more likely to belong to the same topic as the reference image than later selected co-selected images.

In some implementations, an image must be selected within a threshold time period relative to the selection of the reference image in order to be identified as a co-selected image. For example, when a duration of a user session is longer than the period within which subsequently selected images are identified as co-selected images, the threshold time period can be used to determine whether an image selected following selection of a reference image is a co-selected image for the reference image.

In some implementations, the topic score for a co-selected image can be the result of a function of the frequency and/or proximity of the selections of the co-selected image relative to selection of the reference image. For example, the topic score can be a sum of the total selections for the co-selected image following selection of the reference image. Similarly, the topic score can correspond to a number of reference images relative to which the image is co-selected. For example, an image that is a co-selected image for ten reference images can have a topic score of "10," while an image that is a co-selected image for five reference images can have topic score of "5."

Each selection of the co-selected image can be weighted by a factor indicative of the proximity of the selection relative to selection of the reference image. For example, each selection can be weighted by the factor 1/(selection number) such that selection of the co-selected image immediately following selection of the reference image will have a weight of 1 (i.e., 1/1). Similarly, the second and third co-selected images following selection of the reference image will have weights of ½ and ⅓, respectively. The weight factor described is provided for example purposes. The weight factor can be any ratio or function of the proximity of co-selected image selection relative to selection of the reference image.

In some implementations, generation of the topic scores for the co-selected images can be facilitated by using weighted graph to map selections of co-selected images relative to selection of the reference image. The reference image and co-selected images are represented by nodes in the weighted graph and edges representing sequential selections of the co-selected images connect the nodes. Generation of a weighted graph is described in more detail with reference to FIGS. 4-5.

Co-selected images having topic scores that satisfy a threshold topic score are labeled (212). In some implementations, the threshold topic score is satisfied when the topic score meets or exceeds the threshold topic score. The threshold topic score can be specified, for example, as an absolute topic score, or a highest N percentage of topic scores among other thresholds (e.g., images having a highest M topic scores).

In some implementations, the co-selected images are labeled to identify the co-selected images as belonging to the same topic as the reference image. For example, textual data matching the reference label for the reference image can be associated with the co-selected images. Alternatively, a topic flag for the co-selected image can be set to identify the co-selected image as belonging to the same topic as the reference image. The label can be stored at a memory location associated with the co-selected image and made available for other systems or subsystems, such as a search system.

Figure 3:
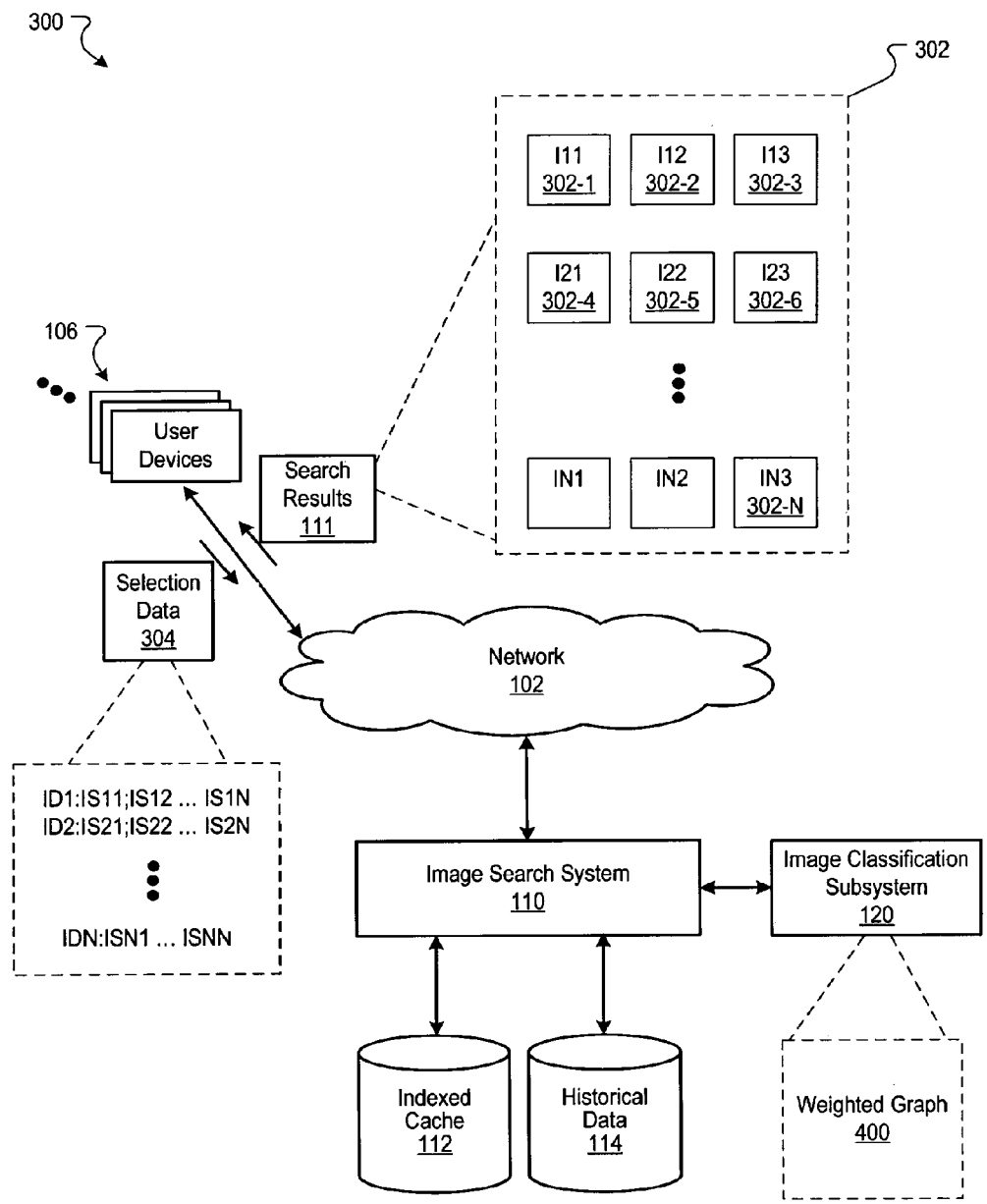
FIG. 3 is an example environment in which user session data is generated and indexed.

FIG. 3 is an example environment 300 in which user session data is generated and indexed. The image classification subsystem 120 and the search system 110 are represented in FIG. 3 as communicating directly, but the image classification subsystem 120 and the search system 110 can be implemented to communicate over the network 102.

A user session is generally initiated by a user device 106. For example, the user device 106 can submit an image search query or another request for search results over the network 102. The request can be associated with a unique session identifier and processed, for example, by the search engine 110. The search engine 110 provides the user device 106 with image search results 302 responsive to the search query. The image search results 302 include result images 302-1-302-N that are references (e.g., thumbnails) to images that have been identified by the search system 110 as being relevant to the search query.

User session data identifying the search query and the images referenced by the image search results are associated with a unique session identifier for the user session and stored in the historical data 114. The user session data can include time data that indicates a time at which the user session was initiated (e.g., a time when the search query was received) and/or a time at which the search results 111 were provided to the user device 106.

A user of the user device 106 can select one or more of the result images 302-1-302-N from the image search results 302. Each selection of result images 302-1-302-N generates a request for a resource location that is specified by the selected result image. For example, a selection of result image 302-1 can generate a request for a web page with which the image referenced by the result image 302-1 is presented. In turn, the web page can be provided to the user device 106 for presentation.

Each selection of a result image 302-1-302-N is provided to the image search system 110 through the network as selection data 304. The selection data 304 includes data specifying the unique session identifier (e.g., ID1, ID2, . . . , ID3) that identifies the user session that corresponds to the selections. The selection data 304 also includes data identifying the images (e.g., IS11; IS12, . . . , IS1N) that were selected for presentation, for example, based on selections of image results 302-1-302-N. The selection data 304 can further include time data specifying when each of the images were selected for presentation.

The selection data 304 is obtained by the search system 110 over the network 102 and stored at memory locations of the historical data 114 that are associated with the unique session identifier. Selection data 304 can be obtained for each user device 106 that requests images and over the duration of each user session. Thus, selection data for each image that is selected by user devices 106 during multiple user sessions is accessible from the historical data 114.

In some implementations, the image classification subsystem 120 uses the selection data to construct a weighted graph 400 to map aggregate selections of co-selected images relative to selections of a reference image. In turn, the weighted graph 400 can be used to classify co-selected images.

Figure 4:
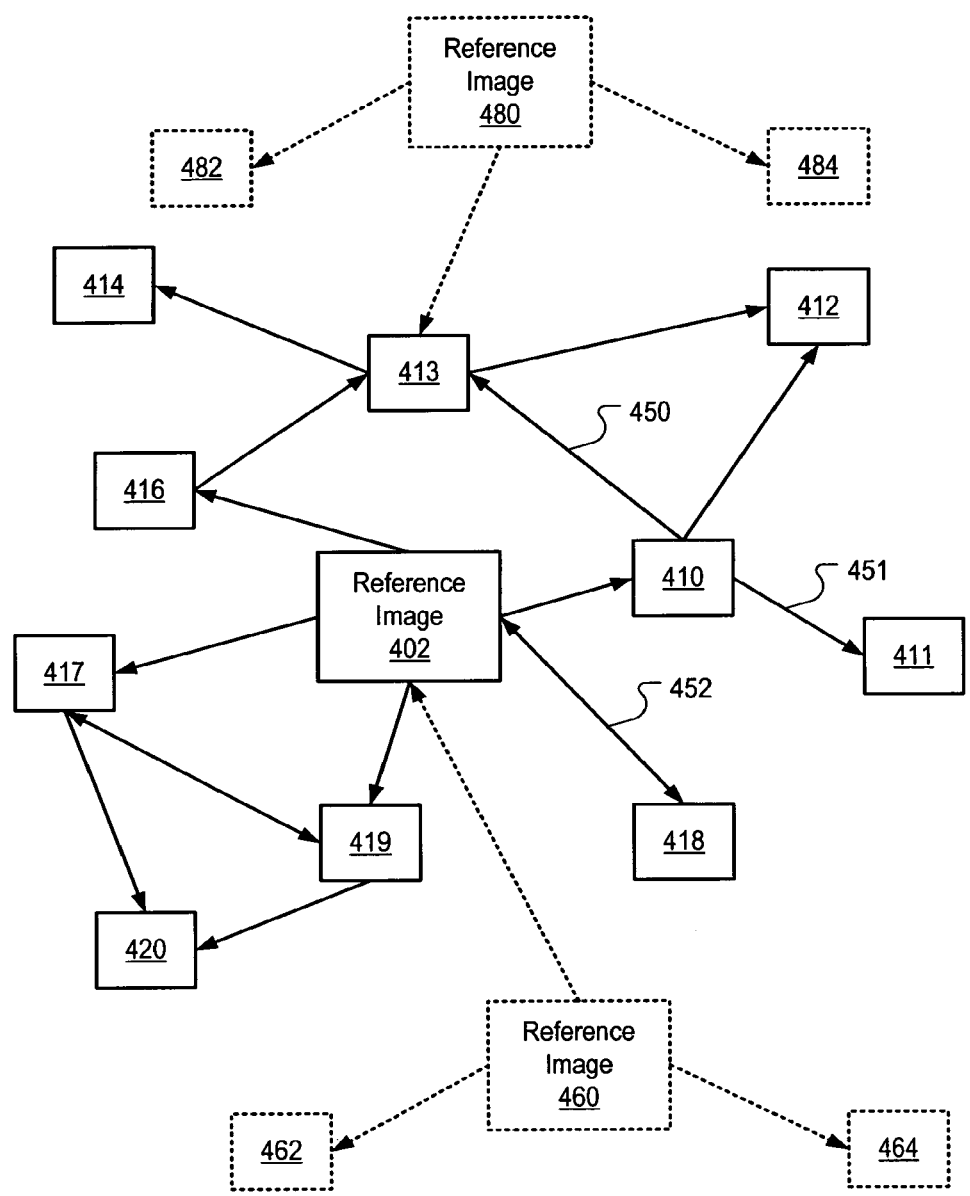
FIG. 4 is an illustration of a weighted graph generated using selection data.

FIG. 4 is an illustration of a weighted graph 400 generated using selection data. In some implementations, the weighted graph 400 is generated by the image classification system 120. For example, the image classification system 120 can obtain selection data from the historical data 120 that specifies selections of a reference image and selections of co-selected images for the reference image over multiple user sessions. The image classification subsystem 120 defines nodes in the weighted graph 400 that represent the reference image and the co-selected images. In turn, the image classification subsystem 120 generates and increments edge weights between nodes representing subsequently selected nodes based on the selection data. Once the weighted graph 400 is generated, it can be used to classify co-selected images based on the weighted edges connected to the nodes representing the co-selected images to other co-selected nodes and to the reference image.

The weighted graph 400 includes a reference node 402 that represents a reference image for which co-selected images are being identified. In some implementations, the reference node 402 represents an image that is identified as a pornographic image, for example, because the image is identified as belonging to a pornographic topic. The topic to which a reference image belongs can be identified, for example, based on a reference label or another topic indicator that is associated with the reference image, as discussed above with reference to FIG. 2.

The weighted graph 400 can include additional reference images 460 and 480. When the additional reference images 440 and 460 are identified and included in the weighted graph, co-selected images are identified for each of the reference images 402, 460 and 480 and edges to co-selected images are weighted based on selections of the co-selected images relative to each of reference images. The additional reference images 460 and 480 can represent images that are also identified as belonging to the reference topic (e.g., pornographic images) or images that are identified as not belonging to the reference topic (e.g., not pornographic images).

The weighted graph also includes nodes 410-420 that represent co-selected images for the reference image. For example, each of the nodes 410-420 represent an image that is a co-selected image for the reference image 402.

Nodes representing sequentially selected images are connected by edges in the weighted graph. For example, edge 450 connects the node 402 to the node 410 representing sequential user selections of the reference image and the co-selected image represented by the node 410. Similarly, edge 451 represents sequential selection of the co-selected image represented by the node 411 subsequent to the selection of the co-selected image represented by the node 410.

The node from which an edge originates is referred to as the source node and the node at which the edge terminates is referred to as the destination node. Continuing with the example above, the source node for the edge 450 is the reference node 402 and the destination node is node 410. Similarly, node 410 is the source node for the edge 451, while node 411 is the destination node. Each edge in the weighted graph 400 is represented by an arrow that points to the destination node.

A bidirectional edge is indicative of reciprocal sequential selections of the images represented by the nodes. For example, the reference node 402 and node 418 are connected by a bidirectional edge 460. The bidirectional edge 452 is indicative of a user selection of the reference image, followed by selections of the co-selected image represented by node 418 and a second selection of the reference image. Alternatively, a pair of unidirectional edges can be used instead of a bi-directional edge.

Each of the edges can have a weight that is indicative of the number of sequential selections of the images represented by the source and destination nodes, respectively. For example, if the image represented by node 410 is selected 10 times following selection of the reference image, the edge 450 can have a weight corresponding to the ten selections.

The weight of an edge may be increased, for example, by a constant incremental amount in response to each identified selection or the weight may be increased based on a function of the number of selections. For example, the weight of an edge can correspond to the number of sequential selections of images represented by the source and destination nodes or the weight can be a logarithmic function or an exponential of the number of sequential selections.

Selection of a co-selected image immediately following selection of the reference image may be more indicative of an image that is relevant to the reference image than an image that is selected following selection of one or more other co-selected images. For example, node 412 represents a co-selected image that was selected following selections of the reference image 402 and the co-selected image represented by node 410. Therefore, the selection of the image represented by node 412 may be less indicative of the relevance of the image to the reference image 402 than the selection of the image represented by node 410 due to the intervening action of selecting the image represented by node 410.

In some implementations, the weight of each edge can be adjusted based on its proximity to the reference image. For example, edge weights can be boosted by a boost factor based on their proximity to the reference node 402. The boost factor can be highest, for example, for edges that connect the reference node 402 to nodes representing co-selected nodes 510, 417, 418 and 419. The boost factor can be reduced for edges that are less proximate to the reference node 402, for example, based on a number of nodes between the edge and the reference node.

In some implementations, the weight of an edge or the amount by which an edge weight is increased in response to a selection can be based on a reference weight of the reference node for the co-selected image. The reference weights are factors that normalize or otherwise adjust the importance of an image selection following selection of the reference image. The reference weights can be based on an analysis of the label feedback for the reference images to determine the likelihood that the reference images are accurately identified as belonging to the reference topic.

For example, based on the label feedback, reference image 402 may be identified as a pornographic image with a probability of 0.7 (e.g., 70% of the label feedback identified reference image 402 as a pornographic image), while reference image 460 may be identified as a pornographic image with a probability of 0.6. Therefore, reference image 402 can be assigned a reference weight of 0.7, while reference image 480 can be assigned a reference weight of 0.6.

The reference weights can be used, for example, to adjust the incremental amount by which an edge weight to a co-selected image is increased. Adjusting the incremental amount by which an edge weight is increased based on the likelihood that the reference image belongs to the topic facilitates direct comparison of edge weights for co-selected images for different reference images having different likelihoods of belonging to the reference topic.

Continuing with the example above, reference image 402 has a higher likelihood of being a pornographic image than reference image 460. Therefore, selection of an image immediately following selection of reference image 402 is more indicative that the selected image is a pornographic image than selection of another image immediately following selection of reference image 460. Accordingly, a weight of an edge (e.g., 452) for a co-selected image (e.g., 418) for reference image 402 will increase more in response to a single selection than the weight of an edge (e.g., 570) for a co-selected image (e.g., 560) for reference image 460 in response to a single selection. These increases in edge weight are representative of the relative likelihood that each of these reference images 402 and 460 are accurately identified as pornographic images.

In some implementations, once a graph is constructed, each of the nodes is assigned an initial weight based on a machine process that identifies the likelihood that the image represented by the node belongs to the reference topic. The initial weights are then adjusted based on co-selection data.

As described above, the likelihood that each of the images belong to the reference topic can be determined based on analysis of the visual characteristics of the images, text associated with the image and other data indicative of the topic to which the image belongs. In these implementations, edges for which a node is a source can be weighted based on the reference weight of the node in a manner similar to that described above.

Figure 5:
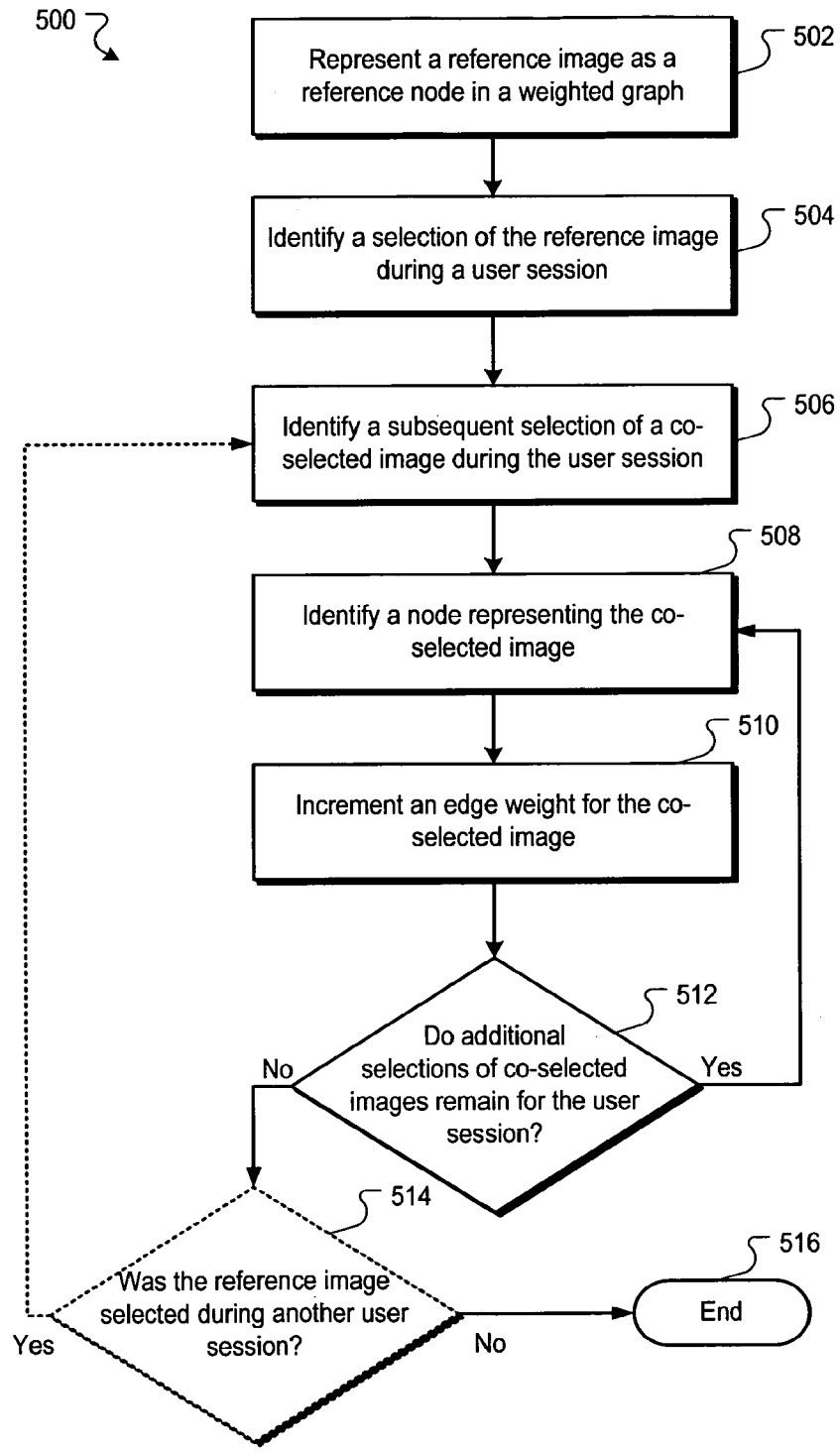
FIG. 5 is a flow chart of an example process for generating a weighted graph.

FIG. 5 is a flow chart of an example process 500 for generating a weighted graph. The weighted graph is used to identify relationships between images based on image selection order and proximity with which images are selected during a common user session. The weighted graph is generated to include reference nodes that represent reference images and nodes representing co-selected images. The weighted graph includes edges that represent sequential selections of images during a common user session. Selection data for many different user sessions can be aggregated and represented in the weighted graph. The process 500 is described with reference to a single reference image, but can be implemented with many different reference images. The process 500 can be implemented, for example, by the image classification subsystem 120 of FIG. 1.

A reference image is represented as a reference node in a weighted graph (502). In some implementations, the reference image is an image that is identified as belonging to a reference topic. For example, the reference image can be an image that is identified as a pornographic image based on a reference label corresponding to a pornographic topic being associated with the reference image. The reference image can be identified, for example, from a data store storing images and labels corresponding to the image. Throughout the description of the process 500, nodes that represent images can be characterized by the same characteristics (e.g., reference labels and selection data) as the images that they represent. Therefore, nodes that represent the images and the images themselves are referred to interchangeably.

A user session, during which the reference image was selected, is identified (504). In some implementations, the user session can be identified based on selection data for the reference image. For example, a selection of the reference image can be identified from selection data for the reference image. In turn, the unique session identifier that is associated with the selection data for the reference image can be used to identify other images having selection data associated with the same unique session identifier. The selection data for the reference image can be obtained, for example, from the historical data store 114.

Once the user session in which the reference image was selected has been identified, subsequent selections of co-selected images during the user session are identified (506). As described above, the subsequent selections of co-selected images can be identified based on selection data associated with the same unique session identifier as the reference image. The selection data for a user session can include time data that specifies when selection of a co-selected image occurred relative to selection of the reference image. Therefore, the time data can be used to identify co-selected images as the images that were selected at times following selection of the reference image during a common user session.

For example, if the reference image was selected at 12:00 am on Jan. 1, 2009, then each image having selection data associated with the same unique session identifier as the reference image and having time data specifying another time that is later than 12:00 a.m., Jan. 1, 2009 is a co-selected image for the reference image.

In some implementations, only co-selected images that were selected within a threshold time period following selection of the reference image are identified as co-selected images for the reference image. The threshold time period facilitates use of selection data obtained for user sessions having a duration that is longer than the time period over which co-selected images are to be identified.

For example, selection data may have been obtained for a user session having a duration of an hour. However, in a particular application co-selection images may be defined as only those images that were selected within 10 minutes of the selection of the reference image. In this situation, the threshold time period can be used to determine whether an image selected during the one hour user session can be identified as a co-selected image for the reference image. For example, the time between selection of the image and selection of the reference image can be compared to the threshold time period. If the time between the relative selections is less than or equal to the threshold, the image is identified as a co-selected image for the reference image.

In some implementations, the selection data for a particular user session can include a list of images that were selected during the user session. The list can be ordered, for example, in the order in which the images were selected during the user session. Therefore, once selection of the reference image is identified in selection data for a user session, every image referenced after the reference image can be identified as a co-selected image.

A node representing the co-selected image is identified (508). In some implementations, the node representing the co-selected image is defined in response to the first identified selection, for example, in a computer memory. In these implementations, after the node representing the co-selected image is defined in the computer memory, the node can be identified from the computer memory location at which the node is defined. For example, the node can be defined in the weighted graph in response to the initial identified selection and then identified in the weighted graph for subsequent identified selections of the co-selected image. In other implementations, each image in a corpus of images is initially represented by a node in the weighted graph, regardless of whether the image is a co-selected image.

When selections of the co-selected image are identified, the node can be identified, for example, based on a unique identifier (e.g., URL) corresponding to the co-selected image and associated with the node. For example, a unique image identifier can be generated for each co-selected image and associated with the image and its corresponding node. When a selection of the co-selected image is identified, the node that is associated with the unique identifier can be identified as representing the co-selected image. Each of the co-selected images are represented by independent nodes in the weighted graph and the nodes in a weighted graph can represent co-selected images for reference images during a single or multiple user sessions.

An edge weight is incremented for the co-selected image (510). In some implementations, when the weighted graph is generated, the edge weight between each node can be initialized to zero (i.e., no edge exists between the nodes). Therefore, the first sequential selection of a co-selected image will generate an edge having a weight corresponding to one standardized unit (e.g., a weight of 1). Additional sequential selections the co-selected image will similarly increment the weight of the edge connecting the nodes by an incremental amount corresponding to the standardized unit.

As described above, weight by which the edge weight is incremented can be adjusted based on a boost factor, a reference weight of a node or another factor for adjusting the relative importance of the selection for which the edge weight is being incremented.

A determination is made whether additional selections of co-selected images remain for the user session (512). The additional selections can be selections immediately following selection of the reference image or selections subsequent to selections of other images. The additional selections can be identified, for example, based on the selections being associated with a unique session identifier that corresponds to the user session.

When additional selections of co-selected images remain for the user session, a node representing another co-selected image is identified (508). When additional selections of co-selected images do not remain for the user session, an optional determination is made whether the reference image was selected during another user session (514). Another selection of the reference image can be identified, for example, based on selection data for the reference image, as described above. When another selection of the reference image is identified, a subsequent selection of a co-selected image during the user session is identified (506). When another selection of the reference image is not identified, the process 500 ends (516).

Once a weighted graph is generated, it can be updated to represent additional selections of reference images and co-selected images for the additional reference images. The weighted graph can be updated periodically based on an update condition being satisfied. The update condition can be, for example, a specified amount of time, user actions, user sessions, or other measure since the last update.

Topic scores can be generated for co-selected images based on the edges that are connected to the nodes representing the images in the weighted graph. In some implementations, the topic score for a particular image can be a sum of edge weights that are connected to a node representing the image, as described with reference to FIG. 2. When the topic score for an image satisfies a threshold topic score, the image is labeled as belonging to the topic. In turn, the image can be identified as a new reference image and defined as such in the weighted graph.

In other implementations, a topic score can be iteratively generated for each of the images represented by nodes in the weighted graph until a stop condition occurs. The topic scores are iteratively generated to facilitate propagation of topic scores throughout the weighted graph, as described below.

The stop condition can occur, for example, when a change in the topic score for each of the images over one or more iterations is less than a threshold change (i.e., converges). In these implementations, the topic scores can be iteratively generated based on the likelihood that reference images and/or other images belong to the reference topic and co-selection data for the images. The likelihood that each of the images belongs to the reference topic can be represented as a vector of topic scores. The initial topic scores can correspond, for example, to the reference weights described above.

FIG. 6A is an example table 600 in which the topic scores for a set of images can be stored and tracked. The table 600 includes a column 602 in which node identifiers that identify each of the nodes in a weighted graph. The table 600 also includes a column 604 in which topic scores corresponding to the nodes identified in column 602 are stored. The topic scores provided in the table 600 are initial topic scores for nodes corresponding to the node identifiers 702a-702e, respectively.

The initial topic scores represent an initial likelihood that each of the images represented by the nodes identified in column 602 belongs to the reference topic. The topic scores can be values from 0.00 to 1.00, where an image having a topic score of 0.00 is an image that is known to not belong to the reference topic and an image having a topic score of 1.00 is an image that is known to belong to the reference topic.

In some implementations, each of the initial topic scores for images that are identified as belonging to the reference topic (i.e., reference images) can be initially set to 1.0, while the initial topic scores for other images are set to 0.0, or some other default value. Through the iterative process described below, final topic scores can be computed for each of the images that were not initially identified as belonging to the reference topic.

In other implementations, an initial topic score is specified for each of the images based on its initial likelihood of belonging to the reference topic. The initial likelihood that each of the images belong to the reference topic can be determined, for example, based on label feedback, image analysis techniques, and textual analysis techniques each of which is described above with reference to FIG. 2.

In some implementations, the co-selection data for images can define a co-selection matrix for images that were co-selected during one or more user sessions. For example, the co-selection data for each pair of images can be a value in an N×N co-selection matrix, where N is the number of images selected during the one or more user sessions.

The co-selection data for a pair of images can specify, for example, a sequential selection rate of the one of the images following selection of the other image or another selection metric for the pair of images (e.g. total sequential selections). The co-selection data can be directional or unidirectional. In some implementations, the co-selection data for a pair of images can correspond to the weight of an edge connecting the pair of nodes representing the images in a weighted graph.

FIG. 6B is an example table 650 in which co-selection data defining a co-selection matrix can be stored. The table 650 includes a row and a column for each node (e.g., 702a-702e) that was selected during one or more user sessions. The co-selection data for each pair of images (e.g., node 702a and node 702c) is occupies a cell corresponding to each of the images of the pair. When co-selection data is not available for a pair of images, a value of "0.00" can be entered in the cell corresponding to the pair of nodes that represent the images. The co-selection data for the pairs of images can be identified, for example, based on selection data for user sessions, as described above with reference to FIG. 2.

The topic scores from table 600 and the co-selection data from the co-selection matrix 650 can be used to identify final topic scores for images that have been co-selected in one or more user sessions. For example, a product of the topic scores for the nodes and the co-selection matrix can be iteratively computed until the stop condition occurs.

FIGS. 7A-7D are example weighted graphs at different points of an iterative topic score generation process. The iterative process can be performed, for example, by the image classification subsystem 120 of FIG. 1. FIGS. 7A-7D illustrate identification of a single topic score for the images relative to a single reference topic. However, topic scores for other reference topics may be computed in the weighted graph 700 or another graph having nodes corresponding to nodes in the weighted graph 700.

Figure 7A:
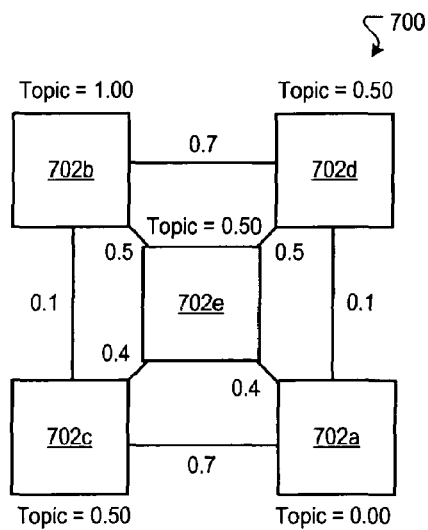
FIGS. 7A-7D are example weighted graphs at different points of an iterative topic score generation process.

Referring to FIG. 7A, weighted graph 700 is generated by the image classification subsystem 120 including initial topic scores for the nodes 702a-e that correspond to the initial topic scores of FIG. 6A. For example, the weighted graph 700 includes the initial topic scores of "0.00" and "1.00" for the nodes 702a and 702b, respectively. The nodes 702c-e each have initial topic scores of "0.50." Similarly, the edges between each pair of nodes have weights corresponding to the co-selection data specified in the table. 650 of FIG. 6B. Using these initial topic scores and co-selection data the image classification subsystem 120 can generate updated topic scores for each of the images that are represented by the nodes 702a-702e, for example, based on a product of the initial topic scores and the co-selection data.

Figure 7B:
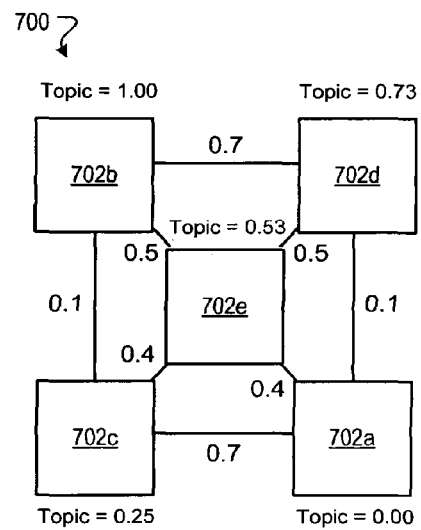

Referring to FIG. 7B, the weighted graph 700 shows the updated topic scores for each of the nodes 702a-e after one iteration of the iterative topic score generation process. In this example, the topic scores of the nodes 702a-b are fixed at "0.00" and "1.00" respectively. The topic score of node 702a is fixed at "0.00" because the image represented by node 702a was initially identified as not belonging to the reference topic. The topic score for node 702b is fixed at "1.00" because the image represented by the node 702b was initially identified as belonging to the reference topic (i.e., a reference image for the reference topic).

The updated topic scores of the nodes 702c-e are now "0.25," "0.73," and "0.53," respectively based, for example, on values of a vector resulting from the product of the co-selection matrix and the initial topic scores. The relatively high magnitude ("0.7") of the co-selection data for the nodes 702a and 702c as compared to other nodes contributes to the updated topic score ("0.25") of node 702c being closer to the topic score of the node 702a ("0.00") than the initial topic score ("0.5") for node 702c. Similarly, the relatively high value ("0.7") of the co-selection data for the nodes 702b and 702d as compared to other nodes gives the node 702d a topic score ("0.73") that is closer to the topic score of the node 702b ("1.00") than the topic scores of other nodes. The value ("0.5") of the co-selection data for node 702e and each of the nodes 702b and 702d is slightly higher than the value ("0.4") of the co-selection data for node 702e and each of the nodes 702a and 702c. Therefore, the updated topic score for node 702e increases slightly towards the topic scores of nodes 702b and 702d.

In some implementations, the image classification subsystem 120 replaces the initial topic scores for the nodes 702a-e with the updated topic scores of FIG. 7B. For example, the updated topic scores can be used to overwrite the initial topic score values that were stored in the table 600 of FIG. 6B. The updated topic scores and the co-selection data are then used to generate additional updated topic scores for the nodes, for example, by computing a product of the updated topic scores and the co-selection data.

Figure 7C:
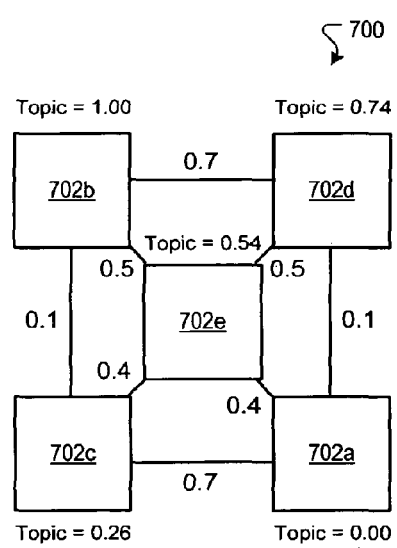

Referring to FIG. 7C, the weighted graph 700 shows the updated topic score for the nodes 702a-e after two iterations of the iterative topic score generation process by the image classification subsystem 120. The updated topic score of the node 702c has increased by "0.01" to "0.26." The updated topic score of the node 702d has increased by "0.01" to "0.74." The updated topic score of the node 702e has increased by "0.01" to "0.54." In some implementations, the image classification subsystem 120 stops the iterative topic score generation when the change in each updated topic score between subsequent iterations is below a particular threshold, such as "0.01."

Figure 7D:
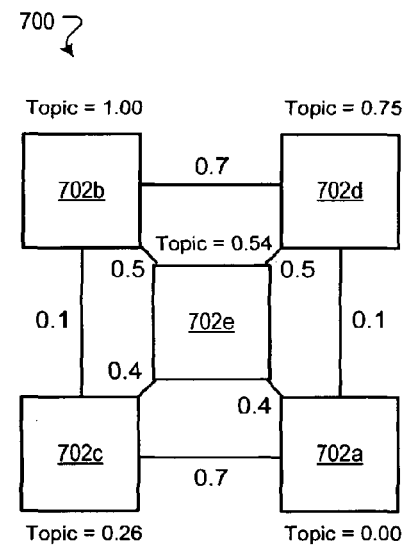

Referring to FIG. 7D, the weighted graph 700 shows the updated topic scores for the nodes 702a-e after four iterations of the iterative topic score generation process by the image classification subsystem 120. The updated topic score of the node 702d has increased by "0.01" to "0.75." The updated topic score of the nodes 702a-e have each converged within "0.01" following the fourth iteration. Therefore, the image classification subsystem 120 stops the iterative topic score generation process and outputs the topic scores for the images represented by the nodes 702a-e.

Alternatively, the image classification subsystem can stop the iterative process after a threshold number of iterations. The threshold number of iterations can be a function, for example, of a number of nodes between two particular nodes in the weighted graph.

Figure 8:
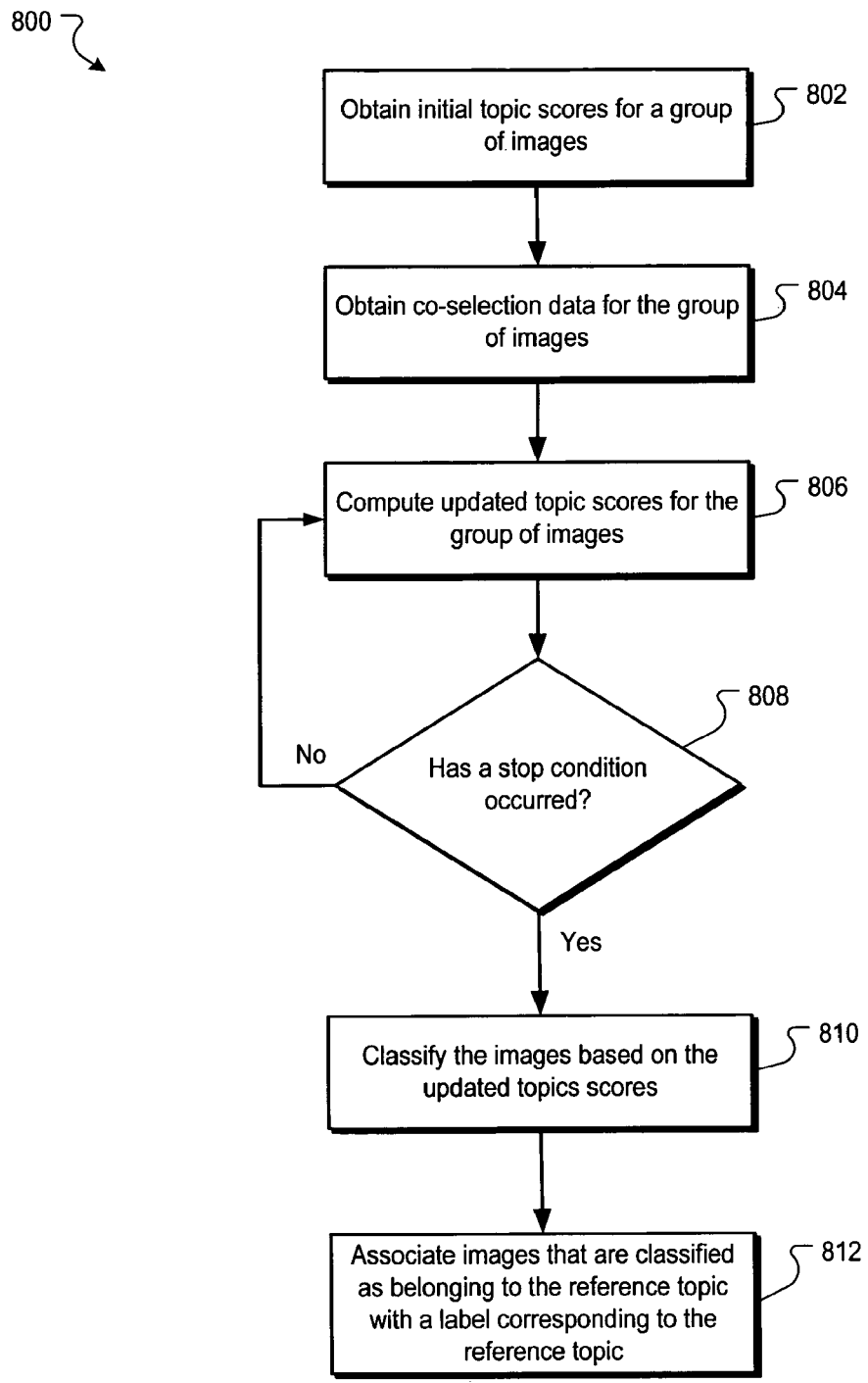
FIG. 8 is an example process for iteratively generating topic scores.

FIG. 8 is an example process 800 for iteratively generating topic scores. The process 800 can be implemented, for example, by the image classification subsystem 120 of FIG. 1.

Initial topic scores are obtained for a group of images (802). In some implementations, the group of images include images that were co-selected during one or more user sessions. The initial topic score for each image is a value specifying of a likelihood that the image belongs to a reference topic. The initial topic scores can be obtained, for example, based on analysis of the images, text associated with the images and/or label feedback data for the images, as described with reference to FIG. 2.

The initial topic scores can be specified for each of the images or a subset of the images. When initial topic scores are specified for each of the images, the values can be between "0.00" and "1.00," where a value of "0.00" is indicative of an image that is known to not belong to the reference topic and a value of "1.00" is indicative of an image that is known to belong to the reference topic.

When initial topic scores are specified for a subset of the images, the subset of images can include only those images that are known to belong to the reference topic. For example, each of the images that is known to belong to the reference topic (i.e., a reference image for the reference topic), can have an initial topic value of "1.00" while every other image has an initial topic value of "0.00." The initial topic scores can be used to define a vector of topic scores, where each initial topic score is a component of the vector.

Co-selection data for the group of images is obtained (804). In some implementations, the co-selection data specifies a relative selection rate for each pair of images in the group of images. For example, if a particular image is selected eight times out of every 10 selections of another image, the relative selection rate for the particular image relative to the other image can be specified as "0.8." The co-selection data can be obtained, for example, based on selection data for user session, as described with reference to FIG. 2. The co-selection data can be used to define a co-selection matrix, as described above with reference to FIG. 6B.

Updated topic scores are computed for the group of images (806). In some implementations, the topic score for each image is a result of a function of the topic scores and the co-selection data. For example, a product of a topic score vector and a co-selection matrix can be computed to generate a topic score vector that specifies updated topic scores for each of the images.

A determination is made whether a stop condition has occurred (808). In some implementations, the stop condition occurs when changes to each of the updated topic scores is below a threshold change (i.e., the topic scores converge). The changes to the updated topic scores can be relative to the topic scores in one or more previous iterations. For example, the absolute change to each topic score over one iteration or a windowed average change over multiple iterations. In other implementations, the stop condition can be the completion of a threshold number of iterations, as described above.

When the stop condition has occurred, the group of images are classified based on the updated topic scores (810). In some implementations, the images having at least a threshold topic score are classified as belonging to the reference topic. In other implementations, a threshold number of images having topic scores that are among a highest portion of topic scores are classified as belonging to the reference topic. The highest portion of topic scores can be, for example, an integer number of highest topic scores or a highest percentage of topic scores.

Images that are classified as belonging to the reference topic are associated with a label corresponding to the reference topic (812). In some implementations, the label is textual data corresponding to the reference topic. For example, images that are identified as pornographic images can be associated with the text "explicit" or "pornographic." In other implementations, images that are identified as belonging to the reference topic can have a data flag set to a binary value indicating that the image belongs to the topic.

Several example values for nodes have been described above. For example, nodes representing images that belong to the reference topic can be assigned a value of "1.0," while nodes representing images that do not belong to the reference class can be assigned an initial value of "0.0." Additionally, nodes can be assigned a value that corresponds to the likelihood that the image represented by the node belongs to the reference topic. While these values have been provided for purposes of example, other values can be assigned to nodes that represent images. For example, nodes that represent images belonging to the reference topic can be assigned a value of "1.0," while images that do not belong to the reference topic can be assigned a value of "−1.0." Similarly, alternative values can be assigned to nodes representing a likelihood that the image belongs to the reference topic. The description above is equally applicable for any manner in which values are assigned to nodes.

Embodiments of the invention and all of the functional operations described in this specification can be implemented in digital electronic circuitry, or in computer software, firmware, or hardware, including the structures disclosed in this specification and their structural equivalents, or in combinations of one or more of them. Embodiments of the invention can be implemented as one or more computer program products, i.e., one or more modules of computer program instructions encoded on a computer-readable medium for execution by, or to control the operation of, data processing apparatus. The computer-readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the invention can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the invention, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing, system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. For example, the actions recited in the claims can be performed in a different order and still achieve desirable results.

What is claimed is:

1. A computer-implemented method, comprising:
    accessing a reference text label that specifies a first topic of a reference image;
    determining, in a data processing system, that a user interacted with an image presented in image search results as responsive to a particular query and during a same user session also interacted with the reference image also presented in the image search results as also responsive to the particular query;
    generating, in the data processing system, a measure of relevance of the image to the first topic based on a number of user sessions in which image search results included both the image and the reference image as responsive to a query and in which a user interacted with both of the reference image and the image; and labeling the image as an image that is relevant to the topic based on the measure of relevance meeting a specified threshold.

2. The method of claim 1, further comprising:

identifying, for a given user session, a first time of a user interaction with the reference image;

identifying subsequent times, during the given user session, of user interactions with other images; and identifying, as co-selected images, only the other images having subsequent times of user interaction that are within a specified time of the first time, wherein the given user session has a session duration and the specified time is less than the session duration.

3. The method of claim 2, further comprising:

representing, in the data processing system, the reference image and co-selected images as nodes in a weighted graph, each node being connected to other nodes by weighted edges representing sequential selections of the images represented by the node and the other nodes; and wherein the measure of relevance for each co-selected image is generated based on the weighted edges.

4. The method of claim 3, wherein a weighted edge connecting a pair of nodes has a weight that is indicative of a number of sequential selections of images represented by the pair of nodes.

5. The method of claim 4, wherein each weighted edge has directional components indicating a source image and a destination image, the source image being an image that was selected for presentation prior to the destination image being selected for presentation.

6. The method of claim 1, further comprising:

receiving image search results responsive to a query that is classified as belonging to a second topic that is different than the first topic; and filtering the image search results to remove references to images having labels that indicate that the images belong to the first topic.

7. The method of claim 1, further comprising:

receiving image search results responsive to a query that is classified as belonging to a second topic that is different than the first topic; and reordering the image search results when the image search results include references to images having labels that indicate that the images belong to the first topic.

8. A system, comprising:

a data store storing a reference text label that specifies a first topic of a reference image and user session data specifying, for user sessions, user interactions with images presented in image search results; and an image classification apparatus that interacts with the data store, the image classification apparatus comprising at least one processor that executes instructions that cause the image classification apparatus to perform operations comprising:

accessing the reference text label that specifies the first topic of the reference image;

determining that a user interacted with an image presented in image search results as responsive to a particular query and during a same user session also interacted with the reference image also presented in the image search results as also responsive to the particular query;

generating a measure of relevance of the image to the first topic based on a number of user sessions in which image search results included both the image and the reference image as responsive to a query and in which a user interacted with both of the reference image and the image; and labeling the image as an image that is relevant to the topic based on the measure of relevance meeting a specified threshold.

9. The system of claim 8, wherein the instructions cause the image classification apparatus to perform operations further comprising:

identifying, for a given user session, a first time of a user interaction with the reference image;

identifying subsequent times, during the given user session, of user interactions with other images; and identifying, as co-selected images, only the other images having subsequent times of user interaction that are within a specified time of the first time, wherein the given user session has a session duration and the specified time is less than the session duration.

10. The system of claim 9, wherein the instructions cause the image classification apparatus to perform operations further comprising:

representing the reference image and co-selected images as nodes in a weighted graph, each node being connected to other nodes by weighted edges representing sequential selections of the images represented by the node and the other nodes; and wherein the measure of relevance for each co-selected image is generated based on the weighted edges.

11. The system of claim 9, wherein a weighted edge connecting a pair of nodes has a weight that is indicative of a number of sequential selections of images represented by the pair of nodes.

12. The system of claim 11, wherein each weighted edge has directional components indicating a source image and a destination image, the source image being an image that was selected for presentation prior to the destination image being selected for presentation.

13. The system of claim 8, wherein the instructions cause the image classification apparatus to perform operations further comprising:

receiving image search results responsive to a query that is classified as belonging to a second topic that is different than the first topic; and filtering the image search results to remove references to images having labels that indicate that the images belong to the first topic.

14. The system of claim 8, wherein the instructions cause the image classification apparatus to perform operations further comprising:

receiving image search results responsive to a query that is classified as belonging to a second topic that is different than the first topic; and reordering the image search results when the image search results include references to images having labels that indicate that the images belong to the first topic.

15. A non-transitory computer readable medium encoded with a computer program comprising instructions that when executed cause one or more data processing apparatus to perform operations comprising:

accessing a reference text label that specifies a first topic of a reference image;

determining that a user interacted with an image presented in image search results as responsive to a particular query and during a same user session also interacted with the reference image also presented in the image search results as also responsive to the particular query;

generating a measure of relevance of the image to the first topic based on a number of user sessions in which image search results included both the image and the reference image as responsive to a query and in which a user interacted with both of the reference image and the image; and labeling the image as an image that is relevant to the topic based on the measure of relevance meeting a specified threshold.

16. The computer readable medium of claim 15, wherein the instructions cause the one or more data processing apparatus to perform operations further comprising:

identifying, for a given user session, a first time of a user interaction with the reference image;

identifying subsequent times, during the given user session, of user interactions with other images; and identifying, as co-selected images, only the other images having subsequent times of user interaction that are within a specified time of the first time, wherein the given user session has a session duration and the specified time is less than the session duration.

17. The computer readable medium of claim 16, wherein the instructions cause the one or more data processing apparatus to perform operations further comprising:

representing the reference image and co-selected images as nodes in a weighted graph, each node being connected to other nodes by weighted edges representing sequential selections of the images represented by the node and the other nodes; and wherein the measure of relevance for each co-selected image is generated based on the weighted edges.

18. The computer readable medium of claim 17, wherein a weighted edge connecting a pair of nodes has a weight that is indicative of a number of sequential selections of images represented by the pair of nodes.

19. The computer readable medium of claim 18, wherein each weighted edge has directional components indicating a source image and a destination image, the source image being an image that was selected for presentation prior to the destination image being selected for presentation.

20. The computer readable medium of claim 15, wherein the instructions cause the one or more data processing apparatus to perform operations further comprising:

receiving image search results responsive to a query that is classified as belonging to a second topic that is different than the first topic; and filtering the image search results to remove references to images having labels that indicate that the images belong to the first topic.

* * * * *